United States Patent
Hattori

(10) Patent No.: US 6,869,064 B2
(45) Date of Patent: Mar. 22, 2005

(54) BUTTERFLY-TYPE CONTROL VALVES HAVING NON-CIRCULAR VALVE MEMBERS

(75) Inventor: Satoshi Hattori, Aichi-ken (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 62 days.

(21) Appl. No.: 10/627,773

(22) Filed: Jul. 28, 2003

(65) Prior Publication Data

US 2004/0021118 A1 Feb. 5, 2004

(30) Foreign Application Priority Data

Jul. 31, 2002 (JP) .......................... 2002-259417

(51) Int. Cl.[7] .............................................. F16K 1/22
(52) U.S. Cl. ....................... 251/305; 123/337
(58) Field of Search ............................... 251/304, 305, 251/308; 137/15.25, 884; 123/337; 264/234, 237

(56) References Cited

U.S. PATENT DOCUMENTS 6,793,197 B2 * 9/2004 DePenning et al. .......... 251/305

FOREIGN PATENT DOCUMENTS

DE          19848440          4/2000

* cited by examiner

Primary Examiner—Timothy L. Maust
(74) Attorney, Agent, or Firm—Dennison, Schultz, Dougherty & MacDonald

(57) ABSTRACT

A butterfly-type control valve (1) includes a valve housing (2) that is molded from synthetic resin. The valve housing has a housing wall that defines a flow path (3). A non-circular valve member (5) is disposed within the flow path and has opposing long sides (5a). The valve member (5) is mounted on a valve shaft (4) that is rotatably supported by the valve housing. The housing wall has wall portions (2a) that extend substantially parallel to the long sides (5a) of the valve member. Each of the wall portions (2a) has an inner surface (2a1) that is concave in a direction away from the valve shaft in a state after the valve housing has been molded and before the valve housing has been cooled.

12 Claims, 2 Drawing Sheets

BUTTERFLY-TYPE CONTROL VALVES HAVING NON-CIRCULAR VALVE MEMBERS

This application claims priority to Japanese patent application serial number 2002-259417, the contents of which are incorporated herein by reference.

BACKGROUND OF THE INVENTION

1. Field of the Invention

The present invention relates to butterfly-type control valves, and in particular to butterfly-type control valves having non-circular valve members.

2. Description of the Related Art

DE19848440A1 teaches a butterfly-type control valve, in which a substantially rectangular valve member and a valve shaft are made of synthetic resin and formed integrally with each other by an injection molding process. A valve housing that accommodates the valve member also is made of synthetic resin and formed by an injection molding process. The valve member has opposing longitudinal sides that extend in the direction of the axis of the valve shaft. Because the valve member and the valve body are made of synthetic resin and are formed by injection molding processes, it is necessary to take into consideration of molding tolerances and shrinkage of molded products due to cooling after the molding processes. Therefore, the above publication proposes to join a valve edge part to the valve member through an injection molding process after the valve member has been molded. In addition, a valve mounting portion of the valve housing has a special configuration in order to compensate for shrinkage of the valve shaft.

However, the control valve of the publication still involves a problem, because the valve housing that accommodates the rectangular valve member has a long length in the direction of the valve shaft in comparison with the width (height) of the valve housing. Thus, when the valve housing has been cooled after the molding process, a wall part of the valve housing having a long length may warp inwardly toward the valve member due to the shrinkage.

The same problem also may occur in case that a valve member is not made of synthetic resin but is made of metal. FIG. 3 shows a known butterfly-type control valve that has a metal valve member. The control valve of FIG. 3 has a valve housing 22 that is made of synthetic resin and is formed by an injection molding process. The valve housing 22 defines a flow channel 23. A valve member 25 is disposed within the flow channel 23. The valve member 25 is made of metal and has a substantially rectangular configuration. The valve member 25 is mounted on a valve shaft 26 that is made of metal. Both ends of the valve shaft 26 is rotatably supported by the valve housing 22.

Horizontal wall portions 22b of the valve housing 22 that define the upper and lower walls of the flow channel 23 as viewed in FIG. 3 have a length that is greater than the length of vertical wall portions of the valve housing 22 that define the right and left walls of the flow channel 23.

Therefore, when the valve housing 22 has been cooled after it has been molded by the injection molding process, the shrinkage of the horizontal wall portions 22b is greater than the shrinkage of the vertical wall portions. As a result, the horizontal wall portions 22b may warp inwardly toward the flow channel 23 as exaggeratedly indicated by chain lines in FIG. 3.

As a result, the valve member 25 may contact the wall portions 22b before it reaches a predetermined full-close position.

SUMMARY OF THE INVENTION

It is accordingly an object of the present invention to teach improved butterfly-type control valves that can provide improved control of flow of fluids.

According to one aspect of the present teachings, butterfly-type control valves are taught that may include a valve housing and a non-circular valve member. The valve housing may be molded from a synthetic resin and may include a housing wall that defines a flow path. The housing wall may include wall portions that extend substantially parallel to the long sides of the valve member. An inner surface of each of the wall portions may be concave in a direction away from the valve shaft in a state after the valve housing has been molded and before the valve housing has been cooled.

With this arrangement, the valve member may not contact the wall portions before the valve member reaches a predetermined full-close position, even if the wall portions have been forced to be warped inwardly due to shrinkage as the valve housing is cooled. Therefore, the valve member can reliably smoothly operate to control the flow of a fluid, e.g. air, that flows through the flow path. As a result, accuracy of control of the flow of the fluid can be improved.

According to another aspect of the present teachings, in addition to the concave configuration of the inner surface, an outer surface of each of the wall portions may be convex in the direction away from the valve shaft in the state after the valve housing has been molded and before the valve housing has been cooled.

With this arrangement, the rigidity of the wall portions can be improved because the outer surface is convex to correspond to the concave configuration of the inner surface. As a result, the warpage of the wall portions due to the shrinkage of the cooled valve housing can be further minimized.

Preferably, the inner surface may maintain the concave configuration even after the valve housing has been cooled. Therefore, the smooth operation of the valve member may be further ensured.

Preferably, the inner surface (and/or the outer surface) of each of the wall portions may extend along an arc. For example, such an arc may extend in a direction substantially parallel to the corresponding long side of the valve member. This arrangement is advantageous because the construction of the wall portions may not be complicated.

Preferably, the arc of the inner surface (and/or the outer surface) of each of the wall portions may have a curvature radius R that extends substantially perpendicular to the corresponding long side of the valve member through a substantially middle point of a length of the long side.

Preferably, the curvature radius R and the length L of the long side of the valve member have the relation as expressed by "R≈300,000/L".

DETAILED DESCRIPTION OF THE INVENTION

Figure 1:
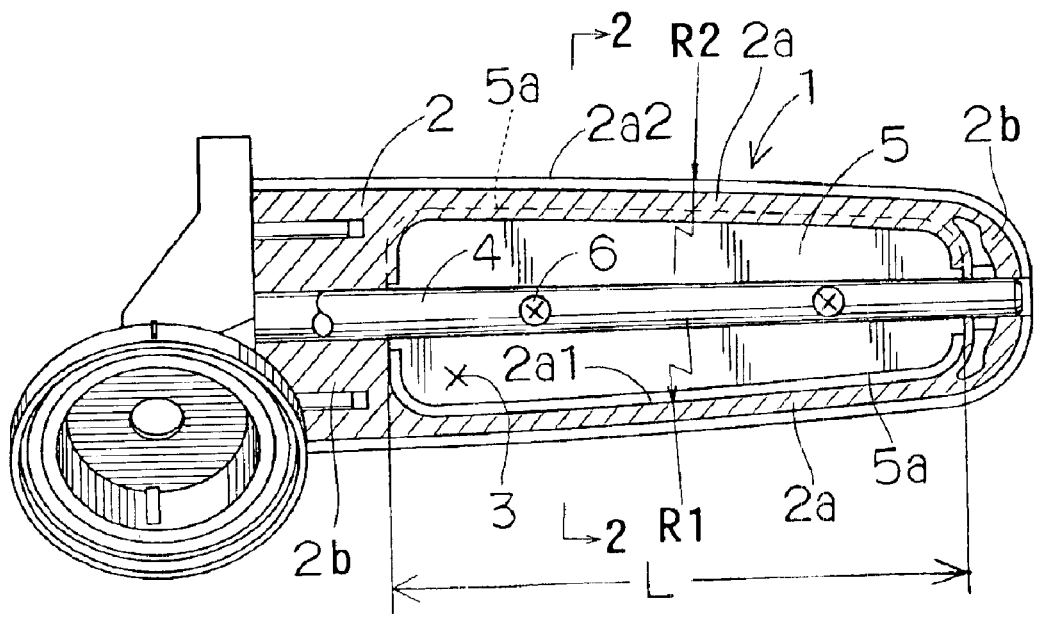
FIG. 1 is a cross sectional view of a representative butterfly-type control valve.

In one embodiment of the present teachings, butterfly-type control valves are taught that may include a valve housing molded from a synthetic resin, e.g., by an injection molding process. The valve housing may include a housing wall that defines a flow path for a fluid, e.g. air. A valve member may be disposed within the flow path and may have a non-circular configuration, e.g. a rectangular configuration or any other polygonal configuration, that has opposing long sides. The valve member may be made of metal or synthetic resin. The valve member may be coupled to a valve shaft. For example, the valve member may be mounted on a valve shaft or may be formed integrally with the valve shaft. The valve shaft may be rotatably supported by the valve housing.

The housing wall may include wall portions that extend substantially parallel to the long sides of the valve member. Each of the wall portions may have an inner surface that is concave in a direction away from the valve shaft in a state after the valve housing has been molded and before the valve housing has been cooled. Preferably, such a concave inner surface may extend along an arc that is curved in a direction substantially parallel to the corresponding long side of the valve member.

With this arrangement, the valve member may not contact the wall portions before the valve member reaches a predetermined full-close position, even if the wall portions have been forced to be warped inwardly due to shrinkage as the valve housing is cooled. In other words, the inner wall may not be deformed to have a configuration that is convex toward the flow path even after the valve housing has been cooled. The inner wall may maintain the concave configuration or may have a substantially linear configuration after the valve housing has been cooled. Therefore, the valve member can reliably smoothly operate to control the flow of the fluid. As a result, accuracy of control of the flow of the fluid can be improved.

In another embodiment of the present teachings, in addition to the concave configuration of the inner surface, an outer surface of each of the wall portions has a configuration that is convex in a direction away from the valve shaft in the state after the valve housing has been molded and before the valve housing has been cooled. Preferably, such a convex outer surface may extend along an arc that is curved in a direction substantially parallel to the corresponding long side of the valve member.

Because the outer surface has the convex configuration, the thickness of the wall portions may not be reduced by the concave configuration of the inner surface, so that the rigidity of the wall portions can be improved. As a result, the warpage of the wall portions inwardly toward the flow path may be further minimized.

Preferably, each of the inner surface of the outer surface of each of the wall portions may extend along an arc that is curved in a direction substantially parallel to the corresponding long side of the valve member. In particular, the arc of the inner surface and the arc of the outer surface may have curvature radiuses R1 and R2, respectively, which radiuses extend substantially perpendicular to the corresponding long side of the valve member through a substantially middle point of a length L of the long side.

Preferably, the curvature radiuses R1 and R2 and the length L of the long side of the valve member may have the relation as expressed by "R1 (or R2)≈300,000/L", in particular, R1 may be equal to R2, so that the thickness of each of the wall portions may become uniform in the direction substantially parallel to the corresponding long side of the valve member.

Each of the additional features and teachings disclosed above and below may be utilized separately or in conjunction with other features and teachings to provide improved butterfly-type control valves. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A representative embodiment will now be described with reference to FIGS. 1 and 2. Referring to FIG. 1, a representative butterfly-type control valve 1 is shown in a cross sectional view. The control valve 1 may include a valve housing 2 that is made of synthetic resin, in particular, thermoplastic resin, e.g., nylon, and may be molded by an injection molding process in a known manner. A flow channel 3 may be defined in a housing wall of the valve housing 2. A metal valve shaft 4 may extend across the flow channel 3. Both ends of the valve shaft 4 may be rotatably supported by the valve housing 2. A metal valve member 5 may be secured to the valve shaft 4 by screws 6. One end of the valve shaft 4 may be coupled to an actuator (not shown), so that the valve member 5 rotates together with the valve shaft 4 when the actuator is driven to rotate the valve shaft 4. Therefore, the flow rate of a fluid that flows through the flow channel 3 can be controlled in response to the rotational angle of the valve shaft 4. The valve member 5 may have a substantially rectangular configuration and may have a pair of opposing long sides 5a that extend substantially parallel to the axial direction of the valve shaft 4. The flow channel 3 also may have a rectangular configuration in cross section to correspond to the configuration of the valve member 5. Therefore, the housing wall of the valve housing 2 may have upper and lower wall portions 2a disposed on upper and lower sides of the flow channel 3, respectively, and a right and left wall portions 2b disposed on right and left sides of the flow channel 13, respectively. The upper and lower wall portions 2a may extend in right and left directions as viewed in FIG. 1 (substantially parallel to the long sides 5a of the valve member 5) and the length of the upper and lower wall portions 2a may be greater than the length (height) of right and left wall portions 2b.

Each of the upper and lower wall portions 2a may have an inner surface 2a1 and an outer surface 2a2. The inner surface 2a1 defines a part of the flow channel 3 and may be concave in a direction away from the valve shaft 4. On the other hand, the outer surface 2a2 may be convex in a direction away from the valve shaft 4. Preferably, each of the inner surface 2a1 and the outer surface 2a2 may have an arc-shaped configuration as viewed in FIG. 1. More specifically, each of the inner surface 2a1 and the outer surface 2a2 may be curved along a direction that is parallel to the corresponding long side 5a of the valve member 5. In addition, the inner surface 2a1 and the outer surface 2a2 may have curvature radiuses R1 and R2 that extend substantially perpendicular to the corresponding long side 5a through a middle point of a length L of the corresponding long side 5a.

Preferably, the radiuses R1 and R2 and the length L of the long side 5a of the valve member 5 may be determined to have the relationship as expressed by "R1=R2≈300,000/L".

For example, if the length L is 150 mm, R1 and R2 may be set to be 2,000 mm. With this determination of the relationship, a space between the valve member 5 and the inner surfaces 2a1 of the upper and lower wall portions 2a can be reliably ensured.

Figure 2:
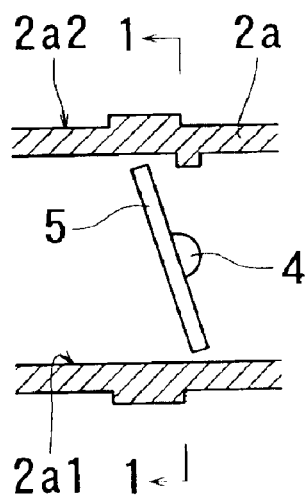
FIG. 2 is a sectional view taken along line 2—2 in FIG. 1.
Figure 3:
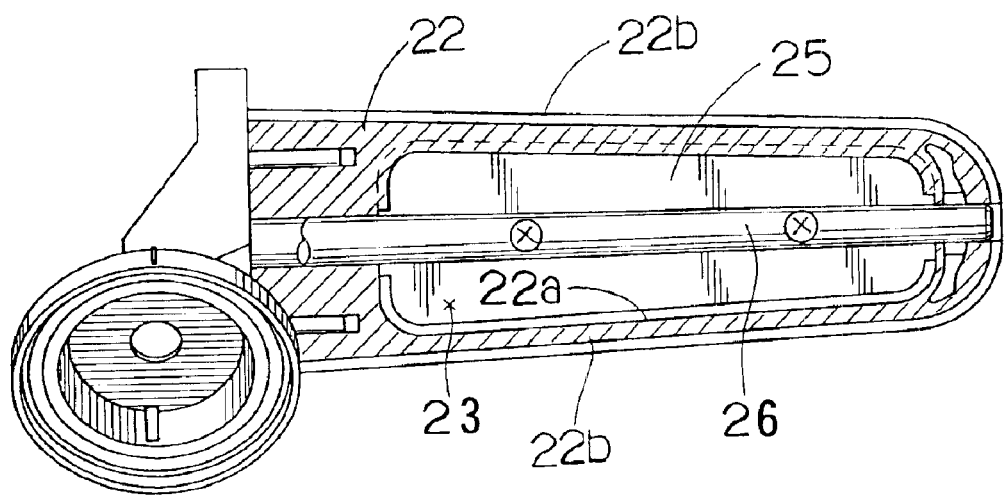
FIG. 3 is a cross sectional view of a known butterfly-type control valve.

For the purpose of illustration, in FIGS. 1 and 2, the valve housing 2 is shown in the state immediately after the injection molding process and before the cooling process. Therefore, the inner surface 2a1 and the outer surface 2a2 shown in FIGS. 1 and 2 have the curvature radiuses R1 and R2, respectively. As the valve housing 2 is cooled, forces may be applied to the upper and lower wall portions 2a to warp these portions. However, the upper and lower portions 2a may substantially maintain their configurations shown in FIG. 1, because the curvature radiuses R1 and R2 may improve the rigidity of the upper and lower wall portions 2a. Even if the curvature radiuses R1 and R2 have been increased due to the warpage, the inner surface 2a1 may not be deformed to have a convex configuration toward the valve member 5. In this way, the curvature radiuses R1 and R2 may serve to compensate for the warpage.

The present invention may not be limited to the above representative embodiment but may modified in various ways. For example, the representative embodiment may be modified in the following ways:

(1) The valve member 5 may be made of metal in place of synthetic resin.

(2) The curvature radiuses R1 and R2 may have values other than 300,000/L in response to the material, the molding condition, or any other parameters of the valve housing 2. In addition, the values of the curvature radius R1 and R2 may be different from each other.

(3) The outer surface 2a2 of each of upper and lower wall portions 2b may have a linear configuration along the direction of the corresponding long side 5a of the valve member 5, instead of the curved configuration.

What is claimed is:

1. A butterfly-type control valve comprising:
   a valve housing molded from a synthetic resin, wherein the valve housing includes a housing wall that defines a flow path;
   a non-circular valve member having opposing long sides and disposed within the flow path; and
   a valve shaft rotatably supported by the valve housing, wherein the valve member is coupled to the valve shaft,
   the housing wall including wall portions that extend substantially parallel to the long sides of the valve member; and
   each of the wall portions having an inner surface concaved in a direction away from the valve shaft in a state after the valve housing has been molded and before the valve housing has been cooled.

2. A butterfly-type control valve as in claim 1, wherein the inner surface of each of the wall portions maintains the concave configuration even after the valve housing has been cooled.

3. A butterfly-type control valve as in claim 1, wherein the long sides of the valve member extend substantially linearly, the flow path has a non-circular configuration corresponding to the configuration of the flow path, and the inner surface of each of the wall portions extends along an arc.

4. A butterfly-type control valve as in claim 3, wherein the arc of the inner surfaces is curved in a direction that is substantially parallel to the corresponding long side of the valve member.

5. A butterfly-type control valve as in claim 4, wherein the arc of the inner surfaces has a curvature radius R1 that extends substantially perpendicular to the corresponding long side of the valve member through a substantially middle point of a length L of the long side.

6. A butterfly-type control valve as in claim 5, wherein the curvature radius R1 and the length L of the long side of the valve member have the relation as expressed by "R1≈300,000/L".

7. A butterfly-type control valve comprising:
   a valve housing molded from a synthetic resin, wherein the valve housing includes a housing wall that defines a flow path;
   a non-circular valve member having opposing long sides and disposed within the flow path; and
   a valve shaft rotatably supported by the valve housing, wherein the valve member is coupled to the valve shaft,
   the housing wall including wall portions extending substantially parallel to the long sides of the valve member, each of the wall portions having an inner surface and an outer surface, and
   the inner surface and the outer surface having configurations concaved and convexed in a direction away from the valve shaft, respectively, in a state after the valve housing has been molded and before the valve housing has been cooled.

8. A butterfly-type control valve as in claim 7, wherein the inner surface of each of the wall portions maintain the concave configuration, even after the valve housing has been cooled.

9. A butterfly-type control valve as in claim 7, wherein the long sides of the valve member extend substantially linearly, the flow path has a non-circular configuration corresponding to the configuration of the flow path, and the inner surface and the outer surface of each of the wall portions extend along arcs, respectively.

10. A butterfly-type control valve as in claim 9, wherein the arc of each of the inner and outer surfaces is curved in a direction that is substantially parallel to the corresponding long side of the valve member.

11. A butterfly-type control valve as in claim 10, wherein the arc of the inner surface and the arc of the outer surface have a curvature radius R1 and a curvature radius R2, respectively, that extend substantially perpendicular to the corresponding long side of the valve member through a substantially middle point of a length L of the long side.

12. A butterfly-type control valve as in claim 11, wherein the curvature radiuses R1 and R2 and the length L of the long side of the valve member have the relation as expressed by "R1=R2≈300,000/L".

* * * * *